United States Patent

[11] 3,612,367

| [72] | Inventors | Willi Benz<br>Neuss;<br>Gerhard Tolasch, Dusseldorf, both of<br>Germany |
|---|---|---|
| [21] | Appl. No. | 814,419 |
| [22] | Filed | Apr. 8, 1969 |
| [45] | Patented | Oct. 12, 1971 |
| [73] | Assignee | Schloemann Aktiengesellschaft<br>Dusseldorf, Germany |
| [32] | Priority | Apr. 10, 1968 |
| [33] | | Germany |
| [31] | | P 17 52 152.7 |

[54] CONTINUOUS LONGITUDINAL DIVIDING OR LONGITUDINAL TRIMMING OF METAL PLATES
6 Claims, 10 Drawing Figs.

[52] U.S. Cl. .................................................. 225/97,
83/496, 83/675, 225/103
[51] Int. Cl. ....................................................... B26f 3/00,
B23d 19/06
[50] Field of Search............................................ 85/51, 496,
497, 675, 581; 225/103, 97, 93

[56] References Cited
UNITED STATES PATENTS

| 703,213 | 6/1902 | Parcells.......................... | 83/496 X |
|---|---|---|---|
| 1,063,298 | 6/1913 | Smith ............................ | 83/496 X |
| 1,345,802 | 7/1920 | Munschauer................. | 83/496 X |
| 1,847,857 | 3/1932 | Ames ............................ | 83/495 X |
| 2,439,794 | 4/1948 | Bugatti ......................... | 83/497 X |
| 3,312,135 | 4/1967 | Mraz ............................. | 83/675 |

FOREIGN PATENTS

| 251,897 | 5/1926 | Great Britain................ | 83/496 |

Primary Examiner—Frank T. Yost
Attorney—Holman & Stern

ABSTRACT: A method of and means for the longitudinal trimming or longitudinal dividing of metal plates, particularly of plates more than 20 millimeters thick, by means of pairs of circular blades, wherein the cutting plane is a vertical plane perpendicular to the surface of the plate, and the surfaces that form the cutting edge of at least one of the blades are nowhere either parallel or perpendicular to the cutting plane, but form an angle of preferably between 2° and 20° therewith.

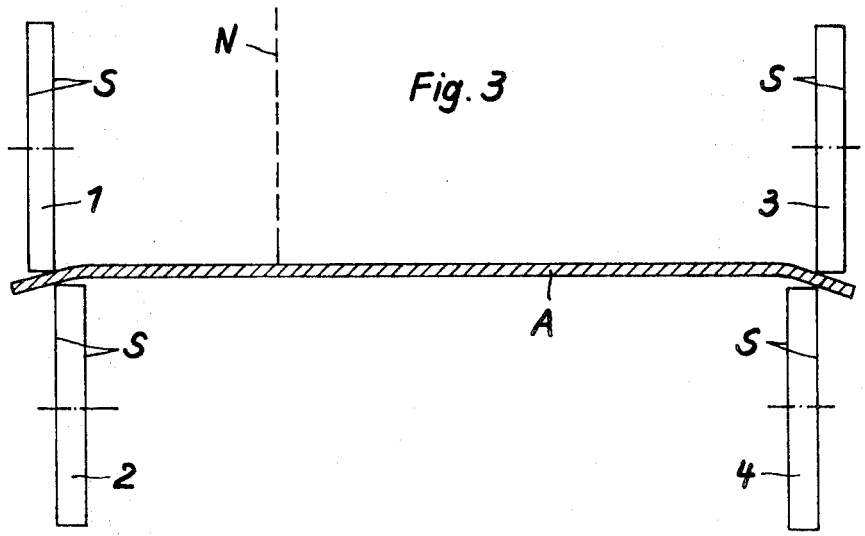
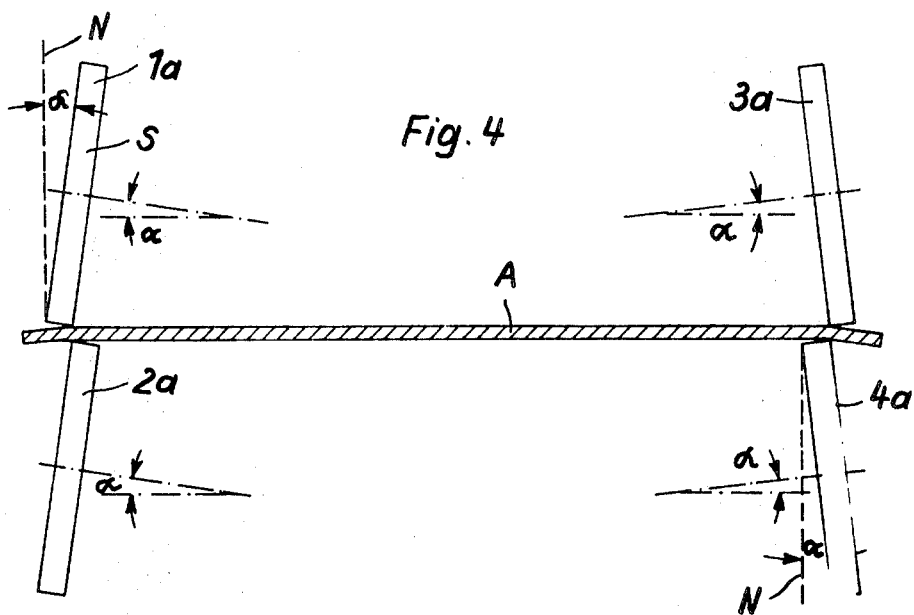

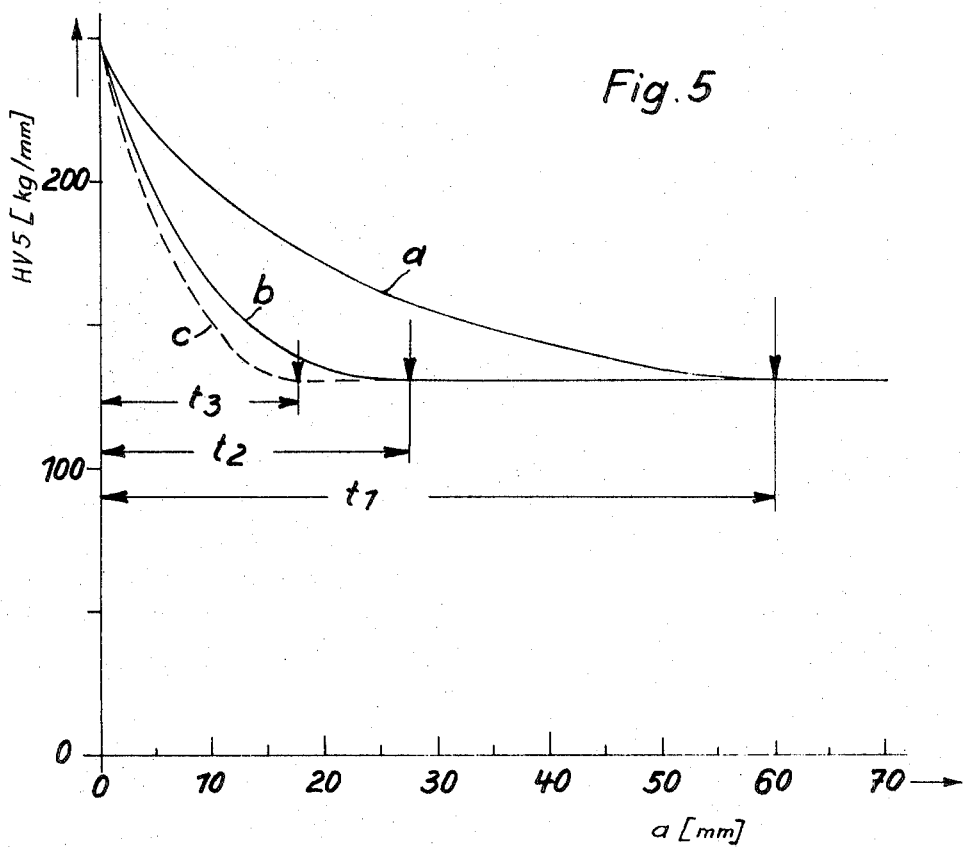

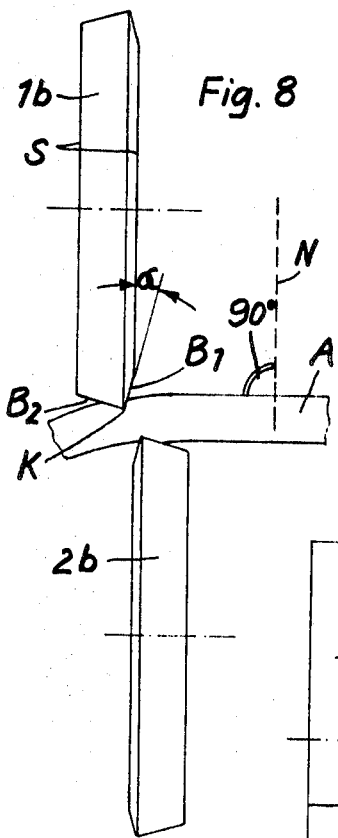
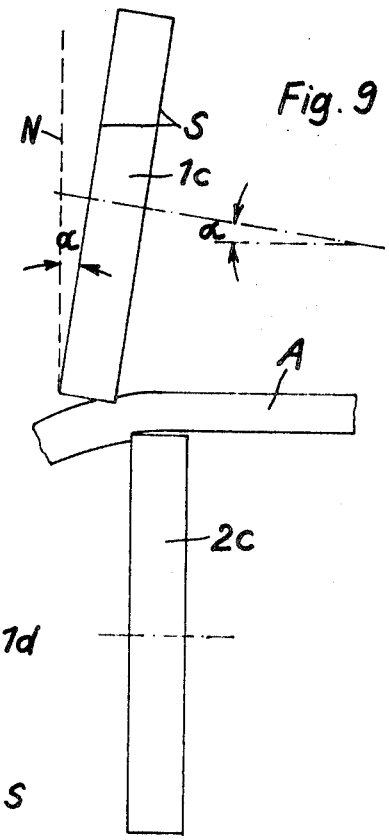
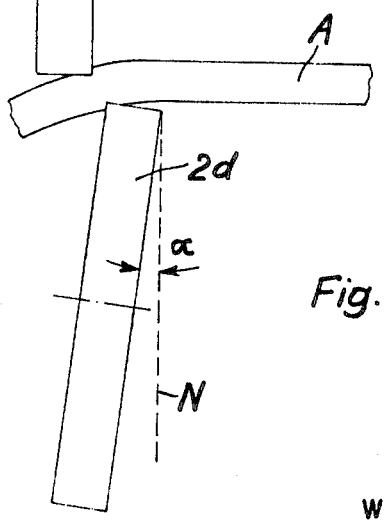

CONTINUOUS LONGITUDINAL DIVIDING OR LONGITUDINAL TRIMMING OF METAL PLATES

This invention relates to a method for the longitudinal dividing or longitudinal trimming, particularly of thick plates, with thicknesses of more than 20 mm., employing rotating disc shears, so-called circular-blade shears.

In the conventional continuous cutting with circular-blade shears, with plates more than 12 mm. thick, errors occur at the trimmed edges of the plates. These increase with blades of greater thickness, so that at present it is only possible, with circular-blade shears, to cut plates up to a maximum thickness of 20 mm. with thicker plates one employs at present double trimming shears or twin shears, which however cannot cut continuously but only discontinuously. During the cutting, the plate must be at rest relatively to the rolling operation.

The special disadvantages that arise in the longitudinal trimming and in the longitudinal dividing of the thicker plates with circular-blade shears as defects are: that by deformation (or bending) of the edges of the plate, notwithstanding a correctly adjusted blade gap, unclean cut edges occur. Furthermore, the cut edge, owing to the bending and to the necessary blade gap, is not perpendicular to the surface of the blade. The lower cut edge is accordingly set back relatively to the upper one.

Further, the edge of the plate is compressed, or even crushed. These defects are the more marked, the greater the thickness of the plate. Moreover to these visible defects are also added undesirable secondary defects, occasioned by the cutting, which again in their turn may lead to further visible cutting defects.

The bending referred to above causes, owing to plastic deformation, a cold-work-hardening of the edge zone of the plate. The depth of this hardened zone becomes greater with the bending. Moreover with plates susceptible to aging (for instance plates of unkilled steels), as a result of the plastic deformation, an embrittlement of the edge zones of the plate occurs owing to aging. This effect is further strengthened particularly when relatively thick plates have not reached room temperature before the cutting takes place, but are cut at higher temperatures, of about 100° C. to 300° C.

The plastic deformation furthermore involves that after the cutting a system of residual stresses is formed in the edge zone of the plate. This system of stresses is multiaxial, and at places where this feature is very marked, the plate becomes very brittle to work. The greater the deformation produced by the cut, the greater will be these intrinsic or residual stresses, and the farther they will extend into the plate.

These defects likewise occur, particularly when cutting plates exceeding 12 mm. in thickness, and increase with increasing plate thickness. With plate thicknesses beyond 16 mm. and particularly in the case of Thomas qualities, cracks, leading to rejects, are liable to form upon shock or deformation (stacking, straightening, machining of the cut edges), in consequence of the embrittlement through aging and resistance to deformation owing to the multiaxial residual stresses.

The residual stresses and deformations introduced furthermore give rise to a greatly increased so-called shear-arcing upon the transverse dividing of the plates. By this transverse dividing of the plates the residual-stress equilibrium is disturbed. It is then reestablished by elastic deformation (arcing, warping).

In discovery of these causes of defects described above, the invention has posed the problem of improving the quality of the cut edges, when cutting with circular--blade trimming shears, and to enable circular-blade trimming shears to be employed even for plate thicknesses of more than 20 mm., with cut edges of a better quality.

For the solution of the problem proposed, a method is proposed for the longitudinal trimming or longitudinal dividing of plates, particularly of plates more than 20 mm. thick, wherein the cutting is effected with pairs of circular blades, wherein the cutting plane extends parallel to the vertical plane, that is to say, parallel to the perpendicular drawn to the surface of the plate, and the surfaces that form the cutting edge of at least one of the circular blades nowhere lie parallel or perpendicular to the cutting plane.

A further solution of the problem posed maintains a method for the same purpose wherein the two blade edges are introduced into the material to be cut, at an inclination to the plane perpendicular to the surface of the plate, so that the cutting plane extends obliquely to the plane perpendicular to the surface of the plate.

By both these methods, owing to an additional force component, a moment is produced by which, in consequence of the special position or construction of the circular-blade, discs of upper and lower blades, a substantially slighter bending of the plate edges, and a slighter depth of the hardened zone, are obtained. Furthermore, with this method a cut surface perpendicular to the surface of the plate is produced.

By this means the range of application of circular-blade shears, which hitherto extended to plate thicknesses up to about 20 mm. can be further widened, with an admissible expenditure, up to plate thicknesses of 30 mm. or even 40 mm. in which case the special advantage of the continuous cutting is to be emphasized.

Owing to the slighter bending, the vertical cut surface and the smaller deformation zones, the result is obtained that:

a. thicker plates than before can be cut, with edge deformations that are still permissible, and thinner plates likewise yield better cutting results than hitherto;

b. the occurrence of edge cracks is largely avoided, and therefore even thicker plates (more than 20 mm. thick) free from cracks can be cut;

c. the shear arcing upon transverse division, which is greatly influenced by the border cutting, is substantially diminished.

This method of cutting is applicable both to the longitudinal trimming and to the longitudinal dividing of plates.

For carrying out the first method, a device is proposed in which at least one circular blade is so inclined that its lateral surface is arranged parallel to the direction in which the material to be cut runs in, and at an angle of from 2° to 20° to the vertical plane perpendicular to the surface of the plate.

The angle of inclination normally amounts to from 4° to 9°, but may lie anywhere in a range of from 2° to 20°.

The position of the circular blades of a pair of circular blades relatively to one another now admits of the most varied constructional forms.

Thus the two circular blades of a pair of circular blades may be so inclined that their lateral surfaces (or front faces) are arranged parallel to the direction of introduction of the material to be cut, and at an angle of from 2° to 20° to the plane perpendicular to the surface of the plate, and in this case both the circular blades may even stand at angular positions of different magnitudes to one another within the range of 2° to 20°.

Furthermore it may be only the upper blade or only the lower blade that is arranged at an inclination, while the other associated circular blades stand with its lateral surface in the direction to the vertical plane perpendicular to the surface of the plate.

The upper blade may be inclined by the angle of inclination towards the middle of the plate, or the lower blade may be inclined by the angle of inclination away from the middle of the plate, particularly in longitudinal trimming.

In the simultaneous trimming of both the longitudinal edges of a plate with double-trimming shears, the upper blades of both the circular-blade trimming shears are inclined towards the middle of the plate, and the lower blades of both the circular-blade trimming shears are inclined away from the middle of the plate.

For carrying out the other method, the device is proposed in which the blade surfaces which form the cutting edges, and/or the tangential planes of the blade surfaces parallel to the direction of introduction of the plates relatively to the plate surface and their perpendiculars are arranged at an inclination. The angle of inclination likewise lies in the range between 2° and 20°, and preferably amounts to from 4° to 9°.

The construction of the circular blades required in this case goes back to a special grinding of the cutting edges of the blades.

Thus at least one circular blade is arranged with its surfaces that form the cutting edge inclined to the lateral surface (front face) of the blade body.

The invention is illustrated by the accompanying drawings, in which:

FIG. 3 shows the blade position for a conventional cut with double-trimming shears;

FIG. 4 shows the inclined blade position adapted according to the invention with double-trimming shears;

FIG. 5 is a diagram illustrating the edge hardening with the trimming cut;

FIG. 8 shows a further constructional example for a special blade construction with special blade grinding; and FIGS. 9 and 10 show further modifications of the blade positions of a pair of circular blades.

Figure 1:
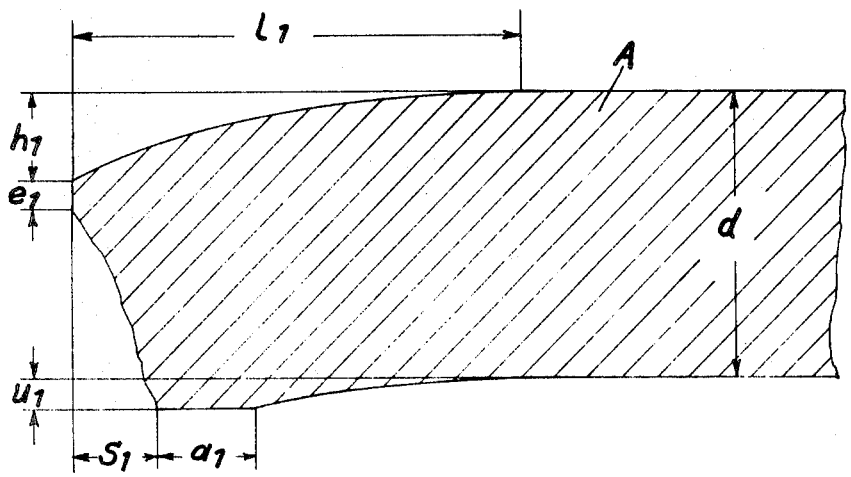
FIG. 1 shows the cutting of the edge of a thick plate by conventional means.

FIG. 1 illustrates the visible defects which arise owing to deformation (bending) of the edges of a plate in conventional circular-blade cutting, with correctly adjusted blade gaps. Here the lateral surfaces S (FIG. 3) of the circular blades stand parallel to the normals N, which form perpendiculars to the surface of the plate. The edge of the plate is plastically bent over a breadth $l_1$ to a depth $h_1$. The cut edge is not perpendicular to the surface of the plate. Is lower edge is set back relatively to its upper edge by the distance $S_1$. The tangent of the angle of obliquity amounts to $$S_1/[d-(h_1+e_1)+u_1]$$

The edge of the plate is compressed. The thickness of the plate at its plate edge no longer amounts to $d$, but $d_k=d+u_1-h_1$.

These defects increase with greater plate thickness. Moreover these visible defects have secondary developments upon the structure of the plate. Thus the bending arising from the plastic deformation causes cold work-hardening of the edge zone of the plate. The depth of the hardened zone becomes greater with increasing bending. For a representation of the variation in hardness see FIG. 5. With plates that are susceptible to aging, an embrittlement of the edge zones of the plate occurs by aging as a result of the plastic deformation.

Figure 2:
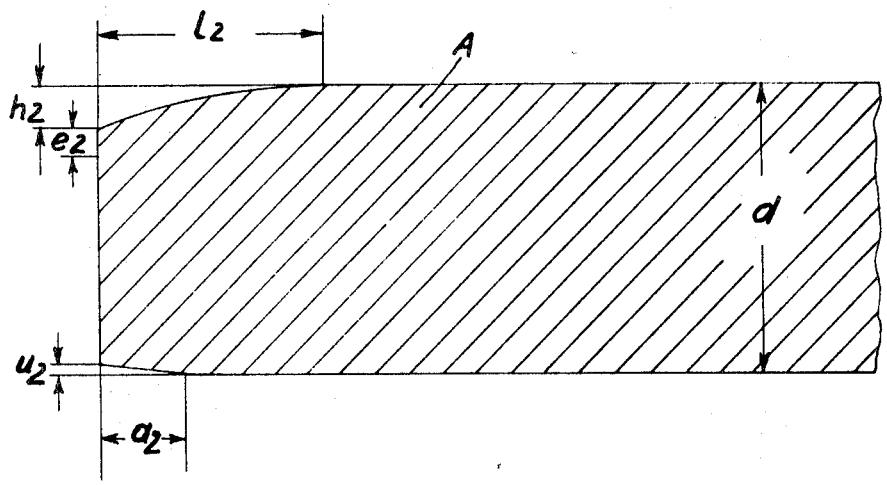
FIG. 2 shows the cutting of the edge of a plate of the same thickness with an inclined blade position.

In FIG. 2 is represented a plate of the same thickness as in FIG. 1, in which the cut has been executed with the inclined blade position according to the invention. Here the length of the bend, $l_2$, is less than $l_1$, and the depth of the bend, $h_2$, is less than $h_1$. The flattening $a_2 \approx a_1$, while the lower thickness deviation $u_2 < u_1$. The cut edge deviation between upper and lower cut edges, which, in FIG. 1, is still very great, as $S_1$, in FIG. 2 is $S_2 \approx 0$.

A comparison of these two cutting results, with plates of the same thickness, already renders the advantages of this method of cutting with an inclined blade position self-evident, and this is also confirmed by a large number of cutting tests.

FIG. 3 shows the position of the pairs of circular blades 1, 2 and 3, 4 in relation to the material A to be cut in the conventional manner with circular-blade trimming shears, that is to say, the lateral surfaces that is, front faces S of the circular blades stand parallel to the perpendicular plane N, that is, to the perpendiculars to the surface of the material being cut, which forms a horizontal plane.

FIG. 4 shows the position of the pairs of circular blades 1a, 2a and 3a, 4a in relation to the material A to be cut, in a position proposed according to the invention. Here the lateral surfaces S of at least one circular blade of the pairs of circular blades 1a, 2a and/or 3a, 4a form, with the plane N perpendicular to the surface of the material to be cut, an angle $\alpha$, which may amount to between 2° and 20°, but is preferably between 4° and 9°.

As FIG. 9 shows, with the pairs of circular blades 1c, 2c, and FIG. 10 with the pairs of circular blades 1d and 2d, it likewise pertains to the invention that as illustrated, only one of the circular blades of a pair should be arranged at an inclination of an angle $\alpha$ to the vertical plane N, while the other circular blade, with its lateral surfaces S, is parallel to the vertical plane N. The engagement illustrated concerns circular-blade trimming shears as longitudinal trimming shears in an opposite arrangement—the arrangement might likewise concern a longitudinal dividing shear or a one-sided longitudinal trimming shear.

In FIG. 5 is illustrated a diagram which represents the edge hardening in the case of a trimming cut of a plate 25 mm. thick of steel St. 42.11 in the curve $a$ with the conventional cutting, and in the curve $b$ when cut with an inclined blade position on circular-blade shears.

On the ordinates of the system of coordinates the Vickers hardness HV 5 kg./mm.$^2$ is marked, and, on the abscissae, the distance $a$ from the cut edge is marked in mm.

In the curve $a$ with the conventional cutting, the slower falling off of the edge hardening from the cut edge, as compared with the curve $b$ with the cutting with an oblique blade position is clearly visible. The curve $c$ represents the edge hardening when cutting with an arcuate-blade shear or a plate shear. The distances $t_1$, $t_2$, $t_3$ right to the measuring point from the cut edge, at which no more edge hardening was measured, are in the proportion of about 6: 3:2.

Figure 6:
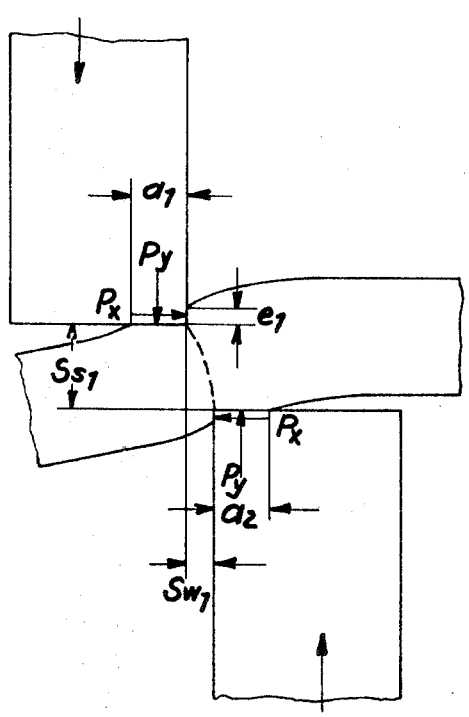
FIG. 6 represents forces and moments occurring in conventional cutting.
Figure 7:
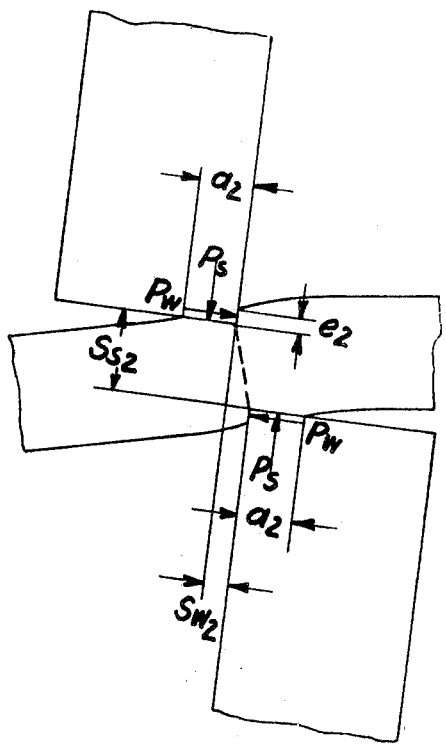
FIG. 7 represents forces and moments occurring when cutting with an inclined blade position.

In FIGS. 6 and 7 the forces and moments are measured that contribute towards the bending of the edges, at the moment of fracture, after penetration of the blade edges by the distance $e$ (moment, in the $Py = \max P_1$ and $Ps$ is $= \max P_2$.

FIG. 6, conventional cutting.
Moment $M_1 = Py(Sw_1+a_1)-Pw(Ss_1+e_1)$
FIG. 7, cutting with inclined blade position:
Moment $M_2 = F_s = (Sw_2+a_2)-Pw(Ss_1+e_1)$
Here, $Sw$ = horizontal blade gap
$Ss$ = vertical blade gap
$e$ = depth of penetration of the cutting edges right up to the fracture of the plate
$a$ = (pressed breadth (plant breadth of the blades) $P_s$)
) = Normal forces to $a_2$ and/or $e_2$ with inclined
$P_w$) blade position
If $Sw_1 = Sw_2$
then $Ss_1 = Ss_2$
$a_2 < a_1; e_2 \approx e_1$
$Ps \approx Py; Pw > Px$,
Thus yielding, for the moments,
$M_2 < M_1$ As compared with conventional cutting, when cutting with inclined blade position a countermoment $MG = M_1 = M_2$ opposes the bending of the edge of the plate. It may be written thus: moment with a straight cut, $M_1 = M_1$
moment with an inclined blade position, $M_2 = M_1 = MG$ Thus the surprising effect that has been discovered of cutting with an inclined blade position on circular-blade shears is also to be explained from the theoretical side.

As apparatus for carrying out the method there come into consideration circular-blade shears with rockable and/or inclined blade-holding means. As illustrated in FIG. 8, the advantage obtained by the inclined position of the circular blades, can likewise be obtained by a special construction of the blade grinding, that is to say, of the inclination of the boundary surfaces forming the cutting edge in relation to the lateral surface S.

The circular blades 1b, 2b of one pair of circular blades stand parallel to the normal N, that is, to the perpendicular upon the plate surface with the lateral surfaces S. For this, however, the blade surface $B_1$, which forms with the blade surface $B_2$, the cutting edge $k$, is ground obliquely to the angle of inclination $\alpha$, so that upon the cutting edge $k$ cutting into the cut material A, by a wedging action, a power component is formed, which is superposed upon the cutting operation, and produces a moment. The angle of inclination $\alpha$ may amount to between 2° and 20°, but is preferably between 4° and 9°.

We claim:

1. A device for longitudinally trimming or longitudinally dividing metal plates more than 20 mm. thick, comprising a pair of cooperating rotatable circular cutting blades, each of said blades having a radial surface and circumferential surface perpendicular thereto, said radial and a circumferential surfaces defining a right-angled cutting edge, said circular blades of a pair being so inclined that their radial surfaces are parallel to the running-in direction of the material to be cut, each of said blades having its rotational axis inclined with respect to the surface of the plate at an angle of between 2° and 20°.

2. A device as claimed in claim 1, the upper blade of a pair being tilted towards the middle of the plate.

3. A device as claimed in claim 1, the lower blade of a pair being tilted towards the middle of the plate.

4. A device as claimed in claim 1, for the simultaneous trimming of the two long sides of a plate, comprising double circular-blade trimming shears, the upper blades of both the trimming shears being tilted towards the middle of the plate, and the lower blades of both the shears being tilted away from the middle of the plate.

5. A device for longitudinally trimming or longitudinally dividing metal plates more than 20 mm. thick comprising a pair of cooperating rotatable circular cutting blades, each of said cutting blades having a radial surface and a circumferential surface each of said cutting blades having an inclined surface connecting said radial surface and said circumferential surface at an angle of from 2° to 20° with respect to said radial surface and a cutting edge defined by the intersection of said inclined surface and said circumferential surface, said surfaces defining said cutting edge both being inclined with respect to the surface of the plate, and each of said cutting blades having its rotational axis substantially parallel to the surface of the plate.

6. A device for longitudinally trimming or longitudinally dividing metal plates more than 20 mm. thick comprising cooperating pairs of rotatable circular cutting blades, each of said blades having a radial surface and a circumferential surface, said circumferential surface being inclined with respect to the surface of the plate, and an inclined surface connecting said circumferential surface and said radial surface at an angle of between 2° and 20° with respect to said radial surface, and defining a sharp cutting edge at the intersection of said inclined surface and said circumferential surface.